United States Patent
Dutta et al.

(10) Patent No.: US 10,268,721 B2
(45) Date of Patent: Apr. 23, 2019

(54) PROTECTED HANDLING OF DATABASE QUERIES

(71) Applicant: salesforce.com, inc., San Francisco, CA (US)

(72) Inventors: Arup Dutta, San Ramon, CA (US); Prem Veeramani, Hayward, CA (US); Jesse Yarbro Collins, Berkeley, CA (US)

(73) Assignee: salesforce.com, inc, San Francisco, CA (US)

( * ) Notice: Subject to any disclaimer, the term of this patent is extended or adjusted under 35 U.S.C. 154(b) by 650 days.

(21) Appl. No.: 14/530,559

(22) Filed: Oct. 31, 2014

(65) Prior Publication Data

US 2015/0127680 A1    May 7, 2015

Related U.S. Application Data

(60) Provisional application No. 61/901,231, filed on Nov. 7, 2013.

(51) Int. Cl.
| | | |
|---|---|---|
| G06F 17/00 | (2006.01) | |
| G06F 17/30 | (2006.01) | |
| G06F 21/62 | (2013.01) | |
| G06F 21/85 | (2013.01) | |

(52) U.S. Cl.
CPC .... *G06F 17/30424* (2013.01); *G06F 21/6218* (2013.01); *G06F 21/85* (2013.01)

(58) Field of Classification Search
CPC ................................................. G06F 17/30424
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

Hector Garcia-Molina and Gio Wiederhold, "Read-Only Transactions in a Distributed Database", ACM Transactions on Database Systems (TODS), vol. 7, Issue 2, Jun. 1982, pp. 209-234.*

(Continued)

*Primary Examiner* — Cheryl Lewis
(74) *Attorney, Agent, or Firm* — Jaffery, Watson, Mendonsa & Hamilton, LLP (57) ABSTRACT

Embodiments regard protected handling of database queries. An embodiment of a method for querying database system views and tables includes: receiving a user query from a user, the user query being directed to one or both of a view and a table of a database, wherein the user is not a database administrator; parsing the user query with a query parser to identify elements of the user query, parsing the query including determining whether the query meets certain database access criteria; automatically generating a database query based on the parsing of the user query, the generation of the database query including generating a database query that is limited by the database access criteria; accessing the one or both of the view and the table using the generated database query, wherein the access is limited to read-only access; and obtaining a result of the access of the one or both of the view and table.

28 Claims, 8 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,842,758 B1* | 1/2005 | Bogrett ............. G06F 17/30448 |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,370,043 B1* | 5/2008 | Shelton ............. G06F 17/30463 707/690 |
| 7,546,312 B1* | 6/2009 | Xu .................... G06F 17/30563 |
| 7,620,655 B2 | 11/2009 | Larsson et al. |
| 7,716,214 B2* | 5/2010 | Li .................... G06F 17/30312 707/719 |
| 7,730,478 B2 | 6/2010 | Weissman |
| 7,739,262 B2* | 6/2010 | Larson ............. G06F 17/30522 707/713 |
| 7,779,039 B2 | 8/2010 | Weissman |
| 7,822,727 B1* | 10/2010 | Shaughnessy .... G06F 17/30371 707/703 |
| 7,873,664 B2* | 1/2011 | Andersch .......... G06F 17/30306 707/601 |
| 8,543,566 B2* | 9/2013 | Weissman ......... G06F 17/30442 707/713 |
| 8,745,032 B1* | 6/2014 | Brown .............. G06F 17/30442 707/713 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0212667 A1* | 11/2003 | Andersch .......... G06F 17/30306 |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0210010 A1* | 9/2005 | Larson ............. G06F 17/30522 |
| 2009/0177744 A1 | 7/2009 | Marlow et al. |
| 2010/0299367 A1* | 11/2010 | Chakrabarti ........ G06F 17/3053 707/803 |
| 2012/0215810 A1* | 8/2012 | Evans ............... G06F 17/30489 707/771 |
| 2013/0151572 A1* | 6/2013 | Brocato ............ G06F 17/30297 707/805 |
| 2015/0169650 A1* | 6/2015 | Gajic ............... G06F 17/30286 707/609 |

OTHER PUBLICATIONS

Rada Chirkova and Fereidoon Sadri, "Query Optimization Using Restructured Views", Oct. 2006 CIKM'06: Proceedings of the 15th (56) References Cited

OTHER PUBLICATIONS

ACM International Conference on Information and Knowledge Management, ACM, pp. 642-651.*

* cited by examiner

USER QUERY 500
"FIND TOP ACTIVE SESSIONS"

DATABASE QUERY 510

SELECT SESION.SID AS SESSION_ID,
SESION.PROGRAM,
NVL(SESION.ACTION,'') AS ACTION,
NVL(SESION.SQL_ID,'') AS SQL_ID,
NVL(ASH.CLIENT_ID,'') AS CLIENT_ID,
NVL(SESION.EVENT,'') AS EVENT,
COUNT(*) AS COUNT
FROM V$ACTIVE_SESSION_HISTORY ASH,
V$SESSION SESION
WHERE
SAMPLE_TIME >= SYSDATE - 30/1440
AND SAMPLE_TIME <= SYSDATE
AND ASH.SESSION_ID = SESION.SID
GROUP BY SESION.SID, SESION.PROGRAM, SESION.ACTION,
SESION.SQL_ID, ASH.CLIENT_ID, SESION.EVENT
ORDER BY 7 DESC

FIG. 5

USER QUERY 600
"FIND TOP SQL'S BY CPU CONSUMED"

DATABASE QUERY 610

SELECT PROGRAM AS PROGRAM_NAME,
NVL(ACTION,' ') AS ACTION,
NVL(SQL_ID,' ') AS SQL_ID,
NVL(CLIENT_ID,' ') AS CLIENT_ID,
COUNT(*) AS COUNT
FROM V$ACTIVE_SESSION_HISTORY
WHERE
SESSION_STATE= 'ON CPU'
AND SAMPLE_TIME >= SYSDATE - 60/1440
AND SAMPLE_TIME <= SYSDATE
GROUP BY PROGRAM,ACTION,SQL_ID,CLIENT_ID
ORDER BY COUNT(*) DESC

FIG. 8

PROTECTED HANDLING OF DATABASE QUERIES

CROSS REFERENCE TO RELATED APPLICATIONS

This United States patent application is related to, and claims priority to U.S. Provisional Patent Application No. 61/901,231 filed Nov. 7, 2013, entitled "System and Method for Querying Database System Views and Tables", the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate to computer systems. More particularly, embodiments relate to protected handling of database queries.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Views and tables, including database system views and tables such as, for example, Oracle's dynamic performance v$ views, can contain a wealth of performance related data that may enable the debugging of database performance degradations and/or the tuning of the database. In conventional operations, a database performance team creates a query to be executed against a database system view, table, or both, and submits the query to a database administrator. The database administrator takes time to review the query, ensuring that the query does not return data provided by a customer of the database because database customers may have service level agreements that ensure the customers that no staff of the database provider will have access to the customer's confidential data. If the database administrator approves the query, the database administrator may execute the query and provide the results of the query to the database performance team, which may use the results to resolve a database performance issue.

However, after a customer has contacted the database performance team to resolve the database issue, the customer has to wait for the database administrator to approve the query and then provide the results to the database performance team before the database performance team can begin to resolve the database performance issue. Accordingly, it is desirable to provide techniques that to assist in the handling of queries of views and tables.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

As used herein:

"Administrator" or "database administrator" means an individual or system having administrative privileges for a database system. Stated in another way, an administrator is an individual or system responsible for configuration and operation of a database system and has the privileges allowing full or wide access to the elements of the database system.

In some embodiments, an apparatus, system, or process provides for protected handling of database queries. In some embodiments, an apparatus, system, or process operates to enable users who are not database system administrators to query views and tables, including database system views and tables (such as, for example, Oracle's v$ views), wherein such query may be performed automatically without endangering the privacy or integrity of data. A system may receive a query (which may be referred to as a user query) to read a view, table, or both from a user interface, wherein the user interface is associated with a user other than a database administrator. For example, a database performance team member, who is not a database administrator, may submit a v$ir_repair query. In some embodiments, the system provides an interface that includes a query parser to automatically write a query or queries (which may be referred to as database queries) in response to receipt of a query from a user. In a certain implementation, the handling of user queries may be enabled by granting a restricted permission to specific users, which users are then authorized to present queries of database views and tables.

In some embodiments, a system reads the view, table, or both of the database based on a received user query. For example, the system reads one of hundreds of database system views based on the v$ir_repair query. In some embodiments, the query parser operates automatically to ensure that only a limited amount of data can be read from the views and tables, such that nothing outside the views and tables can be queried. In this manner, the query parser prevents, for example, private data from customer tables from being queried. In some embodiments, the query parser further ensures a query is limited to data acquisition, which includes, for example, the query parser ensuring that a query is for a read operation, and not for insert, update or delete operations, or other operations that modify or affect data storage and thus endanger data integrity.

In some embodiments, a system returns a result from the reading of a requested view, table, or both to the user interface. A result may be utilized to enable the resolution of a database performance issue. For example, a system may automatically return the result of a v$ir_repair query to the database performance team member, and thus such team member is not required to wait for the intervention of the database system administrator to resolve the database performance issue. In some embodiments, a system may be utilized to enable a database performance team to directly execute queries on the relevant instance and database and act to resolve performance issues without requiring the intervention of an administrator.

The examples provided herein to illustrate the use of technology disclosed herein should not be taken as limiting or preferred. This example sufficiently illustrates the technology disclosed without being overly complicated. It is not intended to illustrate all of the technologies disclosed.

A person having ordinary skill in the art will appreciate that there are many potential applications for one or more implementations of this disclosure and hence, the implementations disclosed herein are not intended to limit this disclosure in any fashion.

Figure 1:
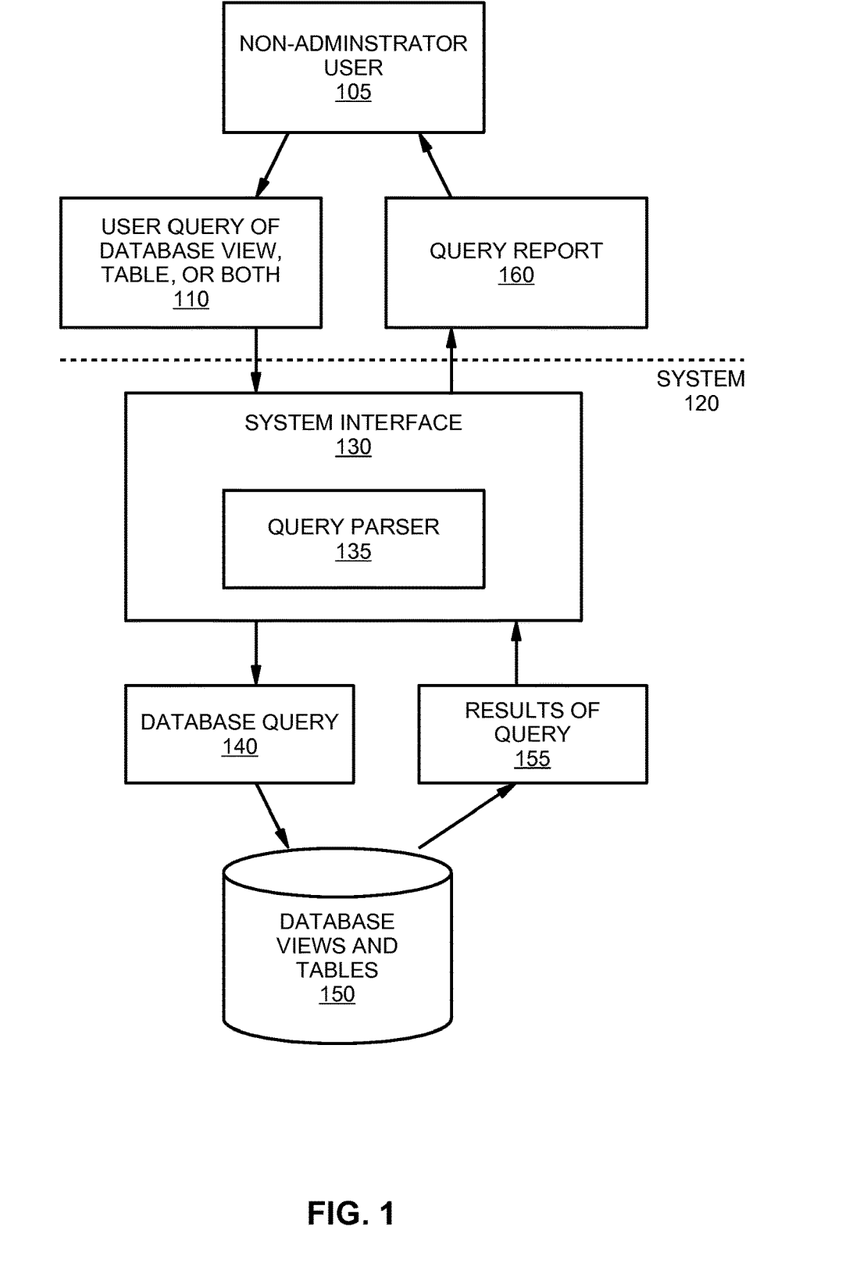
FIG. 1 illustrates protected handling of queries for views and tables of a database according to an embodiment.

FIG. 1 illustrates protected handling of queries for views and tables of a database according to an embodiment. In some embodiments, a non-administrator user (a user of a database who is not an administrator) 105 may provide a query of a view, table, or both of a database 110, including but not limited to a database system view or table such as Oracle v$ views and tables, to a system 120. In some embodiments, the system 120 may initially determine whether the user 105 has been granted authority to present the query. In some embodiments, the system includes a system interface 130, where the system interface 130 includes a query parser 135. In some embodiments, the query parser is operable to automatically parse the query to determine one or more targets of the query, and to evaluate whether the query is acceptable according to certain specified limitations to protect data privacy and integrity. The query parser 135 may, in addition to any other functions, operate to determine whether the query is limited to access of views and tables that do not include private data, and is limited to read access of the data.

In some embodiments, the query parser 135 produces a database query 140 based on the user query to provide access to the requested views and tables 150. In some embodiments, the system interface 130 receives the results of the query 155 and, based on the results of the query, produces a query report 160 as a response to the user query 110.

Figure 2:
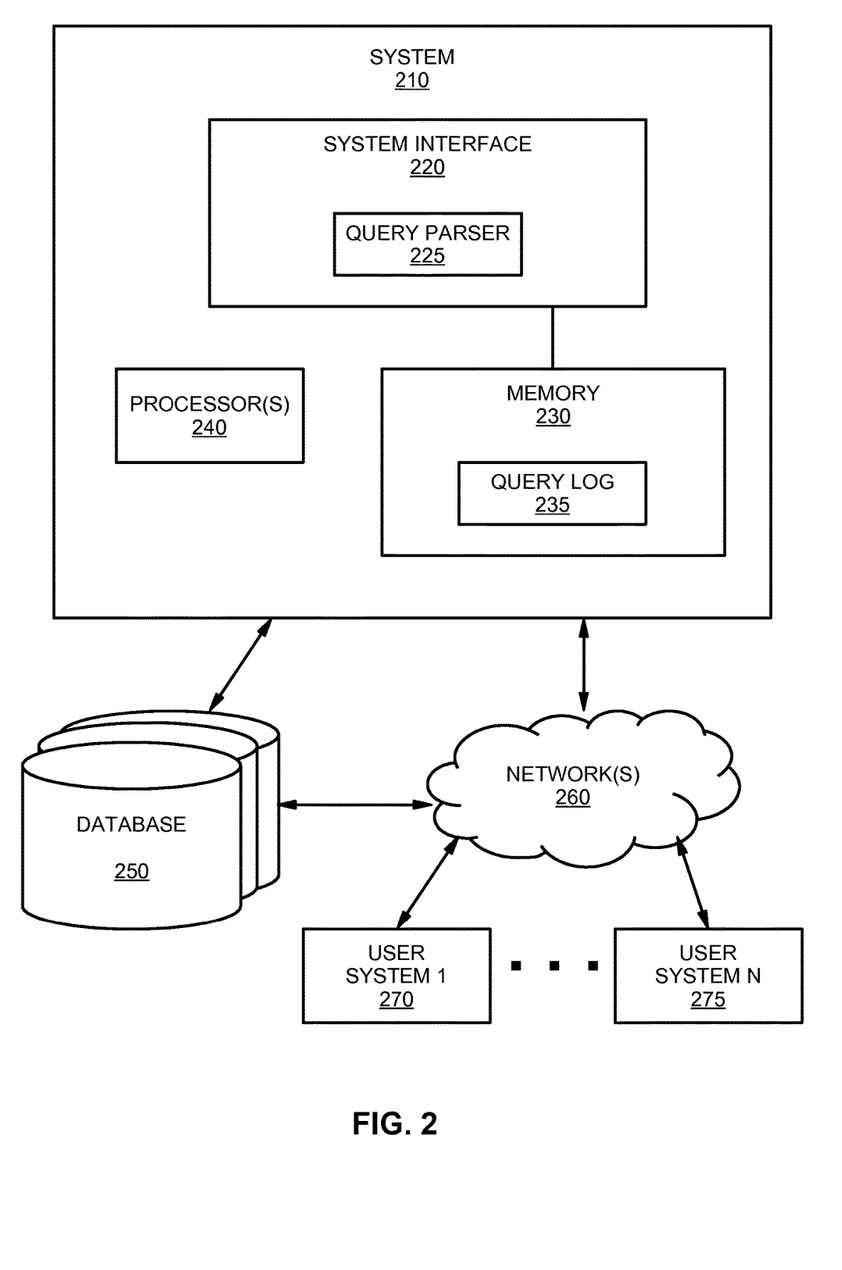
FIG. 2 is a simplified illustration of a system for protected handling of queries of database views and tables from non-administrators according to an embodiment.

FIG. 2 is a simplified illustration of a system for protected handling of queries of database views and tables from non-administrators according to an embodiment. In some embodiments, a system 210 may be connected in a network (or multiple networks) 260 to one or more user systems, such as the illustrated user system 1 270 through user system n 275. As illustrated in FIG. 2, the system 210 includes a database 250 containing data from multiple parties. The database 250 may include a multi-tenant database, and may be located in multiple physical locations. In some embodiments, the system 210 provides a system interface 220 to handle communications from the user systems 270-275, the system interface 220 including a query parser 230 for the handling of database queries from person without administrative privileges.

In some embodiments, the system 210 is operable to allow users without administrative access to provide queries of views and tables of the database 250, the system to automatically parse a user request from one of the user systems 270-275, determine whether the query can be answered, and to generate one or more queries for the database based upon the parsing of the user query. In some embodiments, the system query generated by the query parser provides secure access to the database 250 (which may, for example, be via a direct connection or via a connection through one or more networks 260), preventing access to private information that should not be provided to the requesting user. In some embodiments, the system 210 receives data in response to the system query, and generates a response (which may be referred to as a query report) to the requesting user system 270-275. In this manner, the system automatically provides support for queries of database tables and views from users who do not have full database access (i.e., do not have administrative privileges for the database 250), with the support providing security to prevent improper access to client information.

Figure 3:
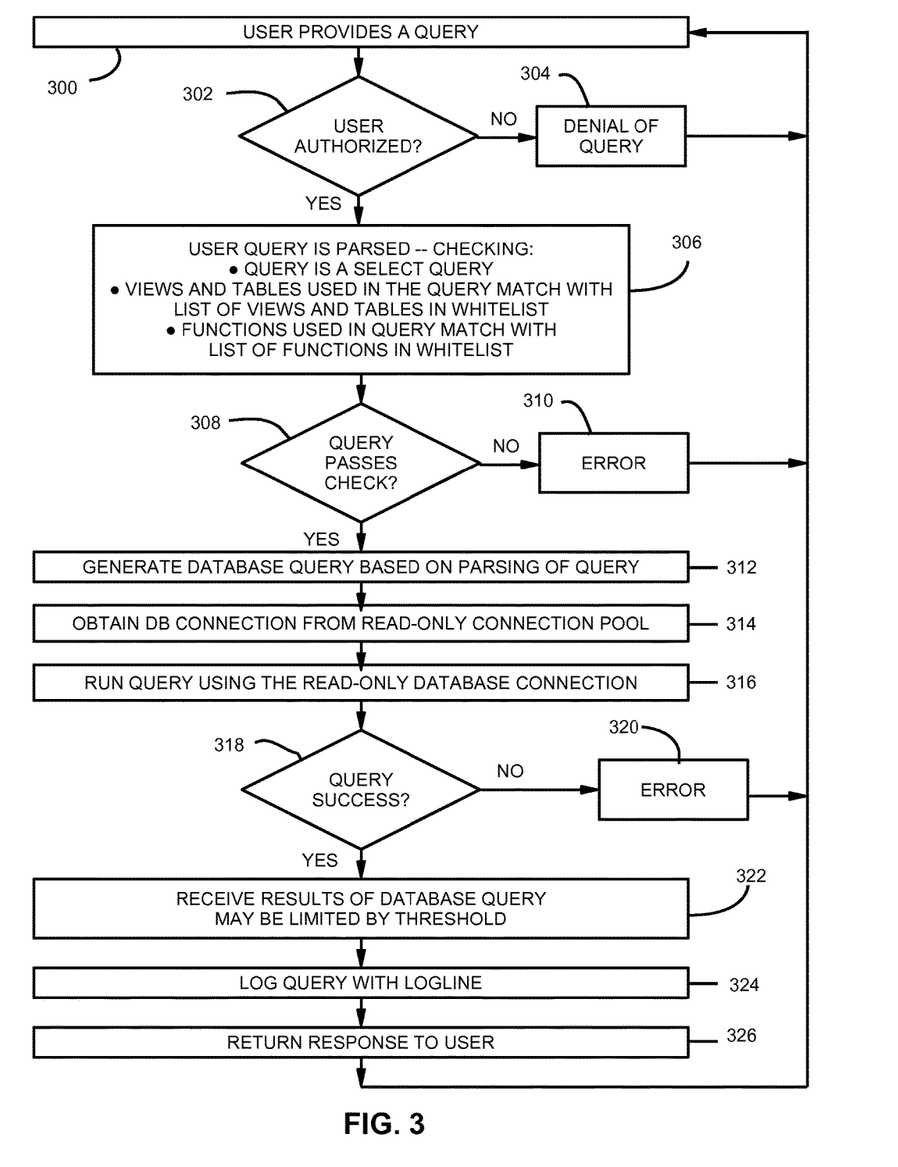
FIG. 3 is a flowchart to illustrate an embodiment of a process for protected non-administrative access to views and tables of a database.

FIG. 3 is a flowchart to illustrate an embodiment of a process for protected non-administrative access to views and tables of a database. As illustrated in FIG. 3, a user without administrative privileges for a database, such as a user communicating via a user system 270-275 to system 210 illustrated in FIG. 2, may provide a user query of views or tables 300. In some embodiments, the receiving system may initially determine whether the user is authorized to provide a query 302, with the query being denied if the system determines that the user does not have authority 304. If the user is authorized, in some embodiments, the user query is parsed to identify the components of the query and to determine whether query is acceptable 306. In some embodiments, the parsing of the query includes determining whether the following database access criteria are met:

(a) Query is a select query (a query that will select and return data, and thus is read-only and will not make any modifications to the database);

(b) Each table or view to be accessed in the query matches entries in a whitelist of tables and views for the database, which may be used to ensure that tables including any private information are not available; and (c) Functions used in the query matches with the list of functions in the whitelist for the database, such as, for example, ensuring that the functions are limited to read-only access of tables or views and do not include any access that would allow writing, moving, or deleting data.

In some embodiments, if the query does not successfully pass the check 308, then an error may be generated 310 or other similar operation to inform the user that the query could not be handled. If the query successfully passes the check 308, the system is to generate a database query (which may include the generation of one or more database queries, depending on the contents of the user query) based on the parsing of the received user query, wherein the generation of the database query includes generating a database query that is limited by the database access criteria 312.

In some embodiments, the system may obtain a database connection from a read-only connection pool 314 to provide the read-only access to the database, and the generated database query is run using the read-only database connection 316. In some embodiments, if the running of the database query is not successful 318, then an error may be generated 320 or other similar operation to inform the user that the query was not successful. In some embodiments, if the running of the query is successful 318, the system receives the results of the data query 322, where such results may be limited by one or more thresholds 324, such as a maximum number rows to be returned in response to the database query may be set to specified value, to ensure that a query does not result in an excessive amount of data.

In some embodiments, after the database query is successfully executed, the query may be logged with a particular auditing logline to maintain a record of user queries 324. In an example, the auditing logline may contain, but is not limited to, the following information: User id of the user who provided the user query; organization id of the user who provided the query; time (such as expressed in milliseconds) taken to execute the query; number of rows (or other measure of data quantity) returned in response to the database query; database node where the database query is executed; and full query statement, which may include one or both of the user query and the generated database query.

In some embodiments, a response is returned to the user 326, the response including some or all of the data returned in response to the database query. In some embodiments, the response may be in the form of a user report containing the resulting data.

Figure 4:
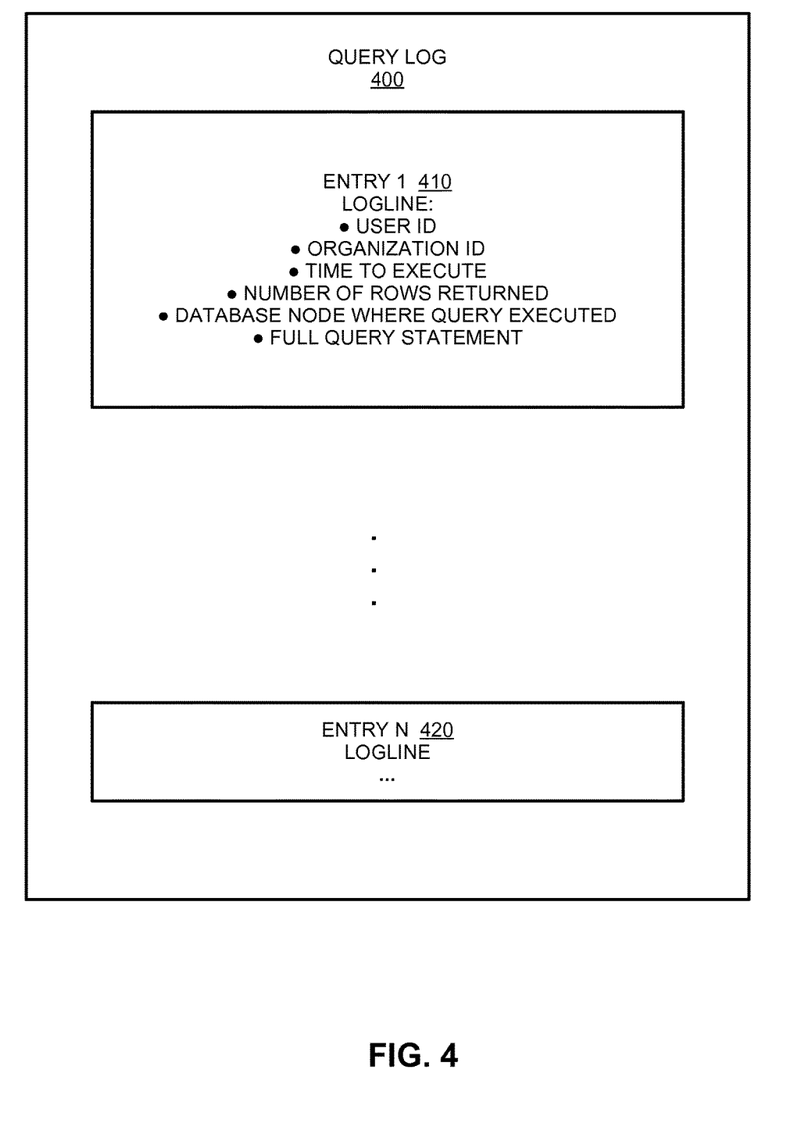
FIG. 4 is an illustration of a query log of database queries according to an embodiment.

FIG. 4 is an illustration of a query log of database queries according to an embodiment. In some embodiments, a query log 400 may include a series of entries for queries that have been successfully run on the database, illustrated here as entry 1 410 through entry n 420.

In some embodiments, after a database query is successfully executed it is logged with an auditing log line. The auditing log line may include, but is not limited to, the following log entries:

(a) User ID (identification) of the user who provided the user query to a receiving system;

(b) Organization ID of the user who provided the use query;

(c) Time (such as expressed in milliseconds) that is taken to execute the database query;

(d) Number of rows (or other measure of data quantity) returned in response to the database query;

(e) Database node where the database query is executed; and (f) Full query statement, which may include one or both of the user query and the generated database query.

Figure 5:
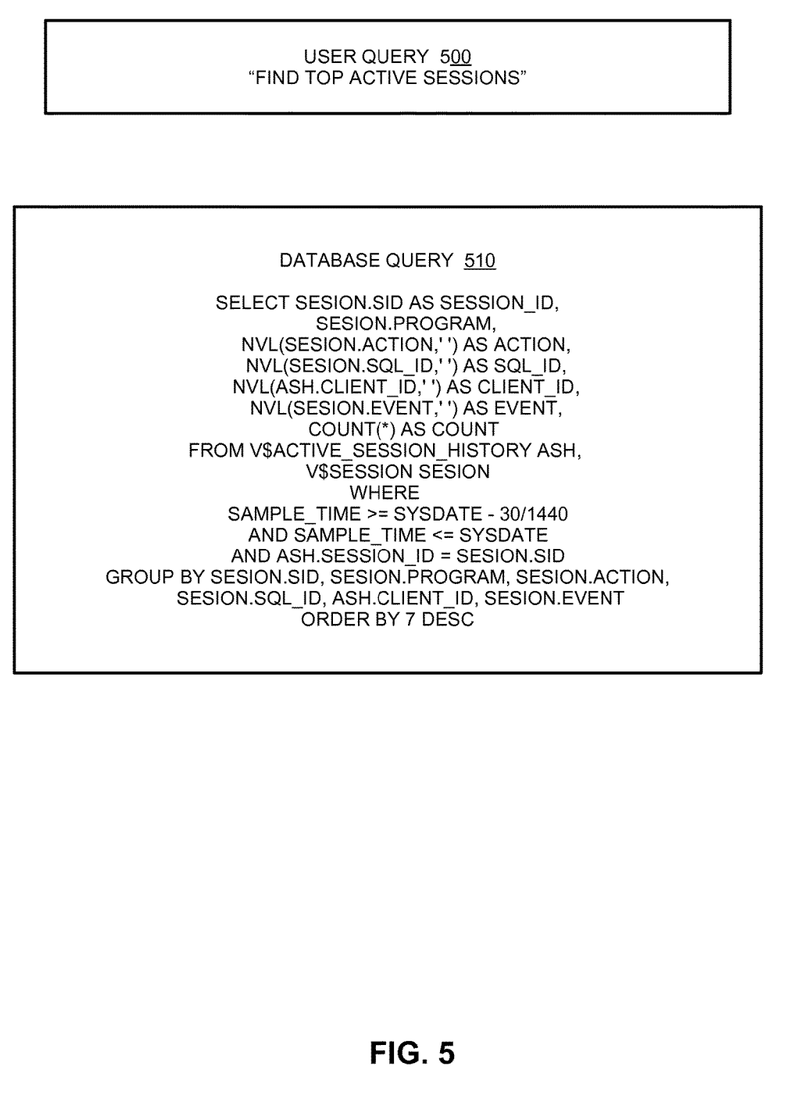
FIG. 5 is a first illustration of generation of a system database query according to an embodiment.
Figure 6:
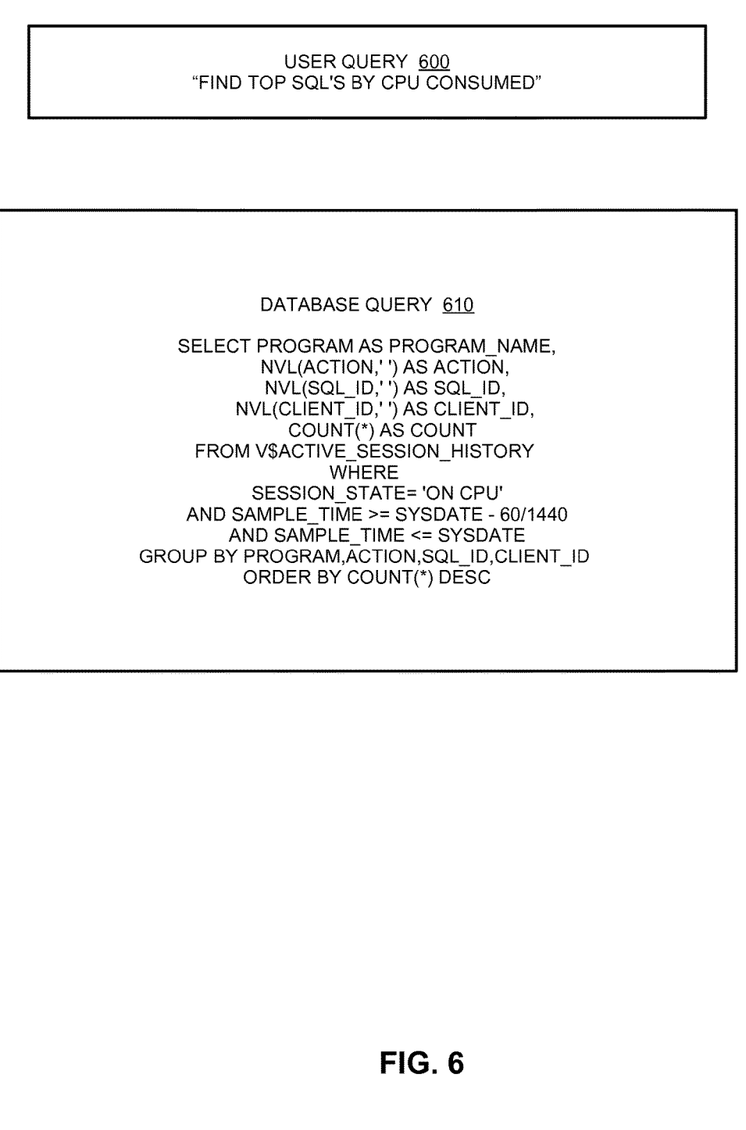
FIG. 6 is a second illustration of generation of a system database query according to an embodiment.

FIG. 5 is a first illustration of generation of a system database query based on a user query according to an embodiment, and FIG. 6 is a second illustration of generation of a system database query based on a user query according to an embodiment. In some embodiments, a system interface includes a query parser to parse received user queries and to generate database queries based on the parsing of such queries.

In a first illustration, referring to FIG. 5, a system may receive a user query 500 from a non-administrator user, which in this instance is a query to "Find top active sessions". In some embodiments, the system is to parse the user query 500 to generate a database query that can be run on the database. In this example, database query 510 is automatically generated based on the parsing of user query 600.

In a second illustration, referring to FIG. 6, a system may receive a user query 600 from a non-administrator user, which in this instance is a query to "Find top SQL's by CPU consumed". In some embodiments, the system is to parse the user query 600 to generate a database query that can be run on the database. In this example, database query 610 is automatically generated based on the parsing of user query 600.

The examples illustrating the use of technology disclosed herein should not be taken as limiting or preferred. These examples are intended to sufficiently illustrate the technology disclosed without being overly complicated. These examples are not intended to illustrate all of the technologies disclosed.

A person having ordinary skill in the art will appreciate that there are many potential applications for one or more implementations of elements of this description, including technology for protected handling of database queries, and the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions that are stored in the memory, to perform a method as described above.

Figure 7:
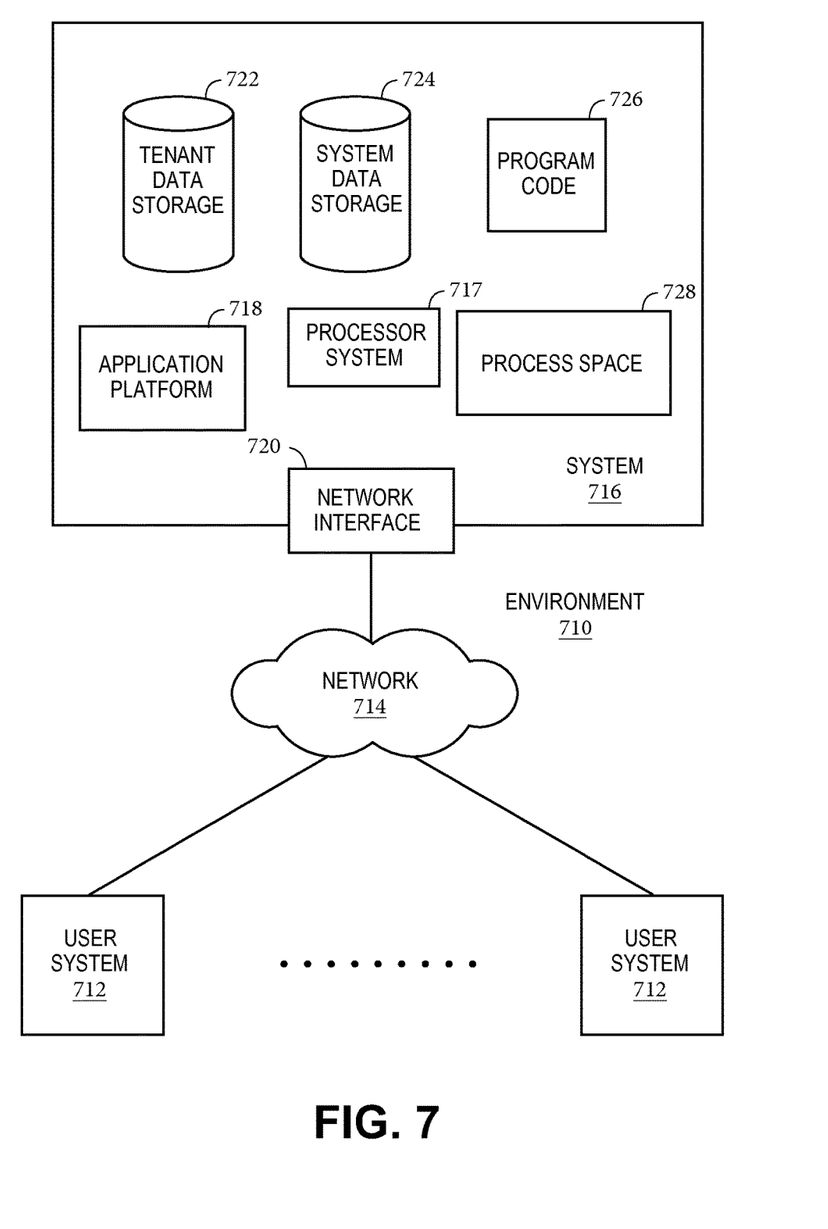
FIG. 7 illustrates a block diagram of an environment wherein database queries from non-administrator users may be provided according to an embodiment.
Figure 8:
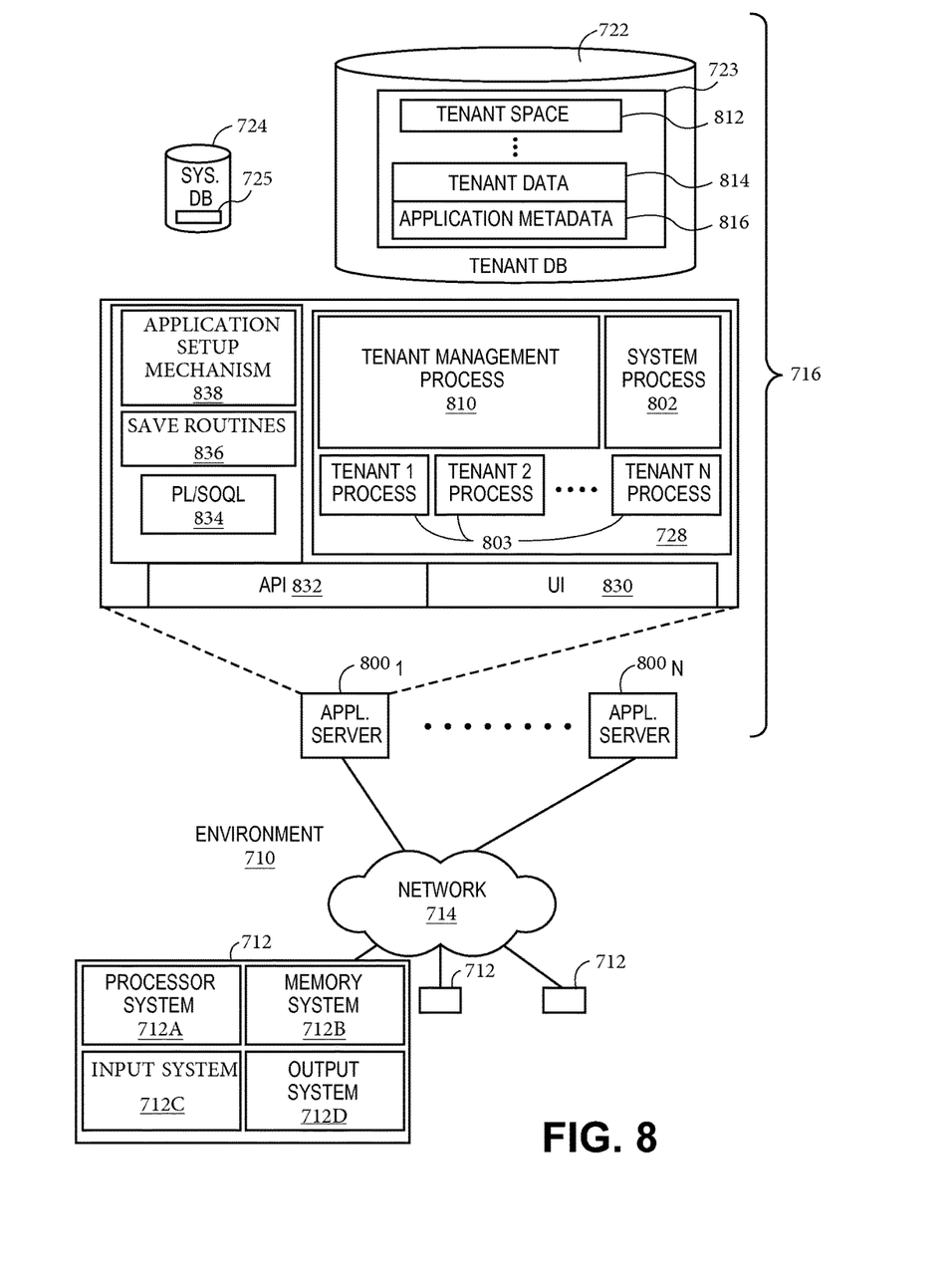
FIG. 8 illustrates details of an environment according to an embodiment.

FIG. 7 illustrates a block diagram of an environment wherein database queries from non-administrator users may be provided according to an embodiment, and FIG. 8 illustrates details of an environment according to an embodiment. Components within an environment 710 may belong to different layers (e.g., compute, management) and may communicate as described above. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a workstation, and/or a network of computing devices. As illustrated in FIG. 7, and in more detail in FIG. 8, user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein.

A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that are used in one or more implementations may not be so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 816.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop or notebook, tablet computer, smart phone, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer, Firefox, Chrome, or a mobile operating system browser in the case of a smart phone, cellular phone, or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen, gesture recognition, or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel processor, including Celeron®, Pentium®, Core®, and Xeon® processors, or the like. Similarly, system 716 (and additional instances of an MTS, where more than one is present) and all of their components might be operator configurable using application(s) including computer code to run using a central processing unit such as processor system 717, which may include an Intel processor or the like, and/or multiple processor units.

A computer program product embodiment includes a machine-readable storage medium (media), including non-transitory computer-readable storage media, having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage space 812, tenant data 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (illustrated in FIG. 7) implemented as a set of HTTP application servers 800, an application platform 718, tenant data storage 722, and system data storage 724.

Also shown in FIG. 8 is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage spaces 812, which can be either a physical arrangement and/or a logical arrangement of data. Within each tenant storage space 812, tenant data 814 and application metadata 816 might be similarly allocated for each user. For example, a copy of a user's most recently used (MRU) items might be stored to tenant data 814. Similarly, a copy of MRU items for an entire organization that is a tenant might be stored to tenant storage space 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800$_1$ might be coupled via the network 714 (e.g., the Internet), another application server 800$_{N-1}$ might be coupled via a direct network link, and another application server 800$_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers. Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. A method for protected handling of queries of database system views and tables, the method comprising:
   receiving a first user query from a first user, the first user query being directed to one or more views or tables of a database, wherein capacities of users of the database are determined by permission levels allotted to the users of the database, the permission levels including a database administrator permission level, and wherein the first user is not allotted the database administrator permission level;
   determining whether the first user has authority to provide the first user query based on the first user's permission level;
   upon determining that the first user has authority to provide the first user query, parsing the first user query with a query parser to identify elements of the first user query including identifying one or more targets of the first user query, and determining whether the identified elements of the first user query meet a set of database access criteria including ensuring that the one or more targets are limited to access of appropriate data based on the first user's permission level;
   upon determining that the identified elements of the first user query meet the set of database access criteria, automatically generating a first database query based on the identified elements of the first user query, the generation of the first database query including limiting the first database query according to the set of database access criteria;
   accessing the one or more views or tables using the automatically generated first database query, wherein the access for the first database query is limited to read-only access;
   obtaining a result of the access of the one or more views or tables;
   allowing the first user to view the result of the access of the one or more views or tables; and
   returning a query report based on the result of the access to the first user.

2. The method of claim 1, wherein determining whether the one or more targets are limited to appropriate data includes determining whether each table or view to be accessed matches entries in a whitelist of tables and views for the database.

3. The method of claim 1, wherein parsing the first user query according to the set of database access criteria includes determining whether the first user query is limited to read-only access of tables and views.

4. The method of claim 3, wherein determining whether the first user query is limited to read-only access includes determining whether functions to be used in the first user query match entries in a whitelist of functions for the database.

5. The method of claim 1, further comprising obtaining a read-only database connection from a read-only connection pool and running the automatically generated first database query using the obtained read-only database connection.

6. The method of claim 1, wherein obtaining the results of the access includes limiting the results of the first database query to be provided in the query report according to a threshold.

7. The method of claim 1, further comprising logging the automatically generated first database query in a query log stored in a memory upon the first database query running successfully.

8. The method of claim 1, further comprising:
   denying the first user query upon determining the first user does not have authority to provide the first user query based on the first user's permission level.

9. The method of claim 1, wherein determining whether the one or more targets are limited to access of appropriate data includes determining that the one or more targets do not include private data.

10. An apparatus for protected handling of queries of database system views and tables, the apparatus comprising:
    an interface for receipt of user queries of databases, the interface including a query parser to parse received user queries;
    a processor to process data, including data for database queries; and
    a memory for storage of data;
    wherein the apparatus is to automatically:
       receive from a first user a first user query directed to one or more views or tables of a database, wherein capacities of users of the database are determined by permission levels that are allotted to the users of the database, the permission levels including a database administrator permission level, and wherein the first user is not allotted the database administrator permission level;
       determine whether the first user has authority to provide the first user query based on the first user's permission level;
       upon determining that the first user has authority to provide the first user query, parse the first user query with the query parser to identify elements of the first user query including identifying one or more targets of the first user query, and determining whether the identified elements of the first user query meet a set of database access criteria including ensuring that the one or more targets are limited to access of appropriate data based on the first user's permission level;
       upon determining that the identified elements of the first user query meet the set of database access criteria, automatically generate a first database query based on the identified elements of the first user query, the generation of the first database query including limiting the first database query according to the set of database access criteria;
       access the one or more views or tables using the automatically generated first database query, wherein the access for the first database query is limited to read-only access;
       obtain a result of the access of the one or more views or tables;
       allow the first user to view the result of the access of the one or more views or tables; and
       return a query report based on the result of the access to the first user.

11. The apparatus of claim 10, wherein determining whether the one or more targets are limited to appropriate data includes determining whether each table or view to be accessed matches entries in a whitelist of tables and views for the database.

12. The apparatus of claim 10, wherein determining whether the first user query meets the set of database access criteria includes determining whether the first user query is limited to read-only access of tables and views.

13. The apparatus of claim 12, wherein determining whether the first user query is limited to read-only access includes determining whether functions to be used in the first user query match entries in a whitelist of functions for the database.

14. The apparatus of claim 10, wherein the apparatus is further to obtain a read-only database connection from a read-only connection pool and to run the automatically generated first database query using the obtained read-only database connection.

15. The apparatus of claim 10, wherein obtaining the results of the access includes limiting the results of the first database query to be provided in the query report according to a threshold.

16. The apparatus of claim 10, wherein the apparatus is further to log the automatically generated first database query in a query log stored in the memory upon the first database query running successfully.

17. The apparatus of claim 10, wherein the apparatus is further to deny the first user query upon determining the first user does not have authority to provide the first user query based on the first user's permission level.

18. The apparatus of claim 10, wherein determining whether the one or more targets are limited to access of appropriate data includes determining that the one or more targets do not include private data.

19. The apparatus of claim 10, wherein a determination regarding which elements are included in the first database query is to be made by the apparatus.

20. A non-transitory computer-readable storage medium having stored thereon data representing sequences of instructions that, when executed by a processor, cause the processor to perform operations comprising:
receiving a first user query from a first user, the first user query being directed to one or more views or tables of a database, wherein capacities of users of the database are determined by permission levels allotted to the users of the database, the permission levels including a database administrator permission level, and wherein the first user is not allotted the database administrator permission level;
determining whether the first user has authority to provide the first user query based on the first user's permission level;
upon determining that the first user has authority to provide the first user query, parsing the first user query with a query parser to identify elements of the first user query including identifying one or more targets of the first user query, and determining whether the identified elements of the first user query meet a set of database access criteria including ensuring that the one or more targets are limited to access of appropriate data based on the first user's permission level;
upon determining that the identified elements of the first user query meet the set of database access criteria, automatically generating a first database query based on the identified elements of the first user query, the generation of the first database query including limiting the first database query according to the set of database access criteria;
accessing the one or more views or tables using the automatically generated first database query, wherein the access for the first database query is limited to read-only access;
obtaining a result of the access of the one or more views or tables;
allowing the first user to view the result of the access of the one or more views or tables; and
returning a query report based on the result of the access to the first user.

21. The medium of claim 20, wherein determining whether the one or more targets are limited to appropriate data includes determining whether each table or view to be accessed matches entries in a whitelist of tables and views for the database.

22. The medium of claim 20, wherein parsing the first user query according to the set of database access criteria includes determining whether the first user query is limited to read-only access of tables and views.

23. The medium of claim 22, wherein determining whether the first user query is limited to read-only access includes determining whether functions to be used in the first user query match entries in a whitelist of functions for the database.

24. The medium of claim 20, further comprising instructions that, when executed by the processor, cause the processor to perform operations comprising:
obtaining a read-only database connection from a read-only connection pool and running the automatically generated first database query using the obtained read-only database connection.

25. The medium of claim 20, wherein obtaining the results of the access includes limiting the results of the first database query to be provided in the query report according to a threshold.

26. The medium of claim 20, further comprising instructions that, when executed by the processor, cause the processor to perform operations comprising:
logging the automatically generated first database query in a query log stored in a memory upon the first database query running successfully.

27. The medium of claim 20, further comprising instructions that, when executed by the processor, cause the processor to perform operations comprising:
denying the first user query upon determining the first user does not have authority to provide the first user query based on the first user's permission level.

28. The medium of claim 20, wherein determining whether the one or more targets are limited to access of appropriate data includes determining that the one or more targets do not include private data.

* * * * *